No. 839,025. PATENTED DEC. 18, 1906.
H. B. OSGOOD, Jr.
SCALE.
APPLICATION FILED OCT. 7, 1904. RENEWED MAY 22, 1906.
2 SHEETS—SHEET 1.
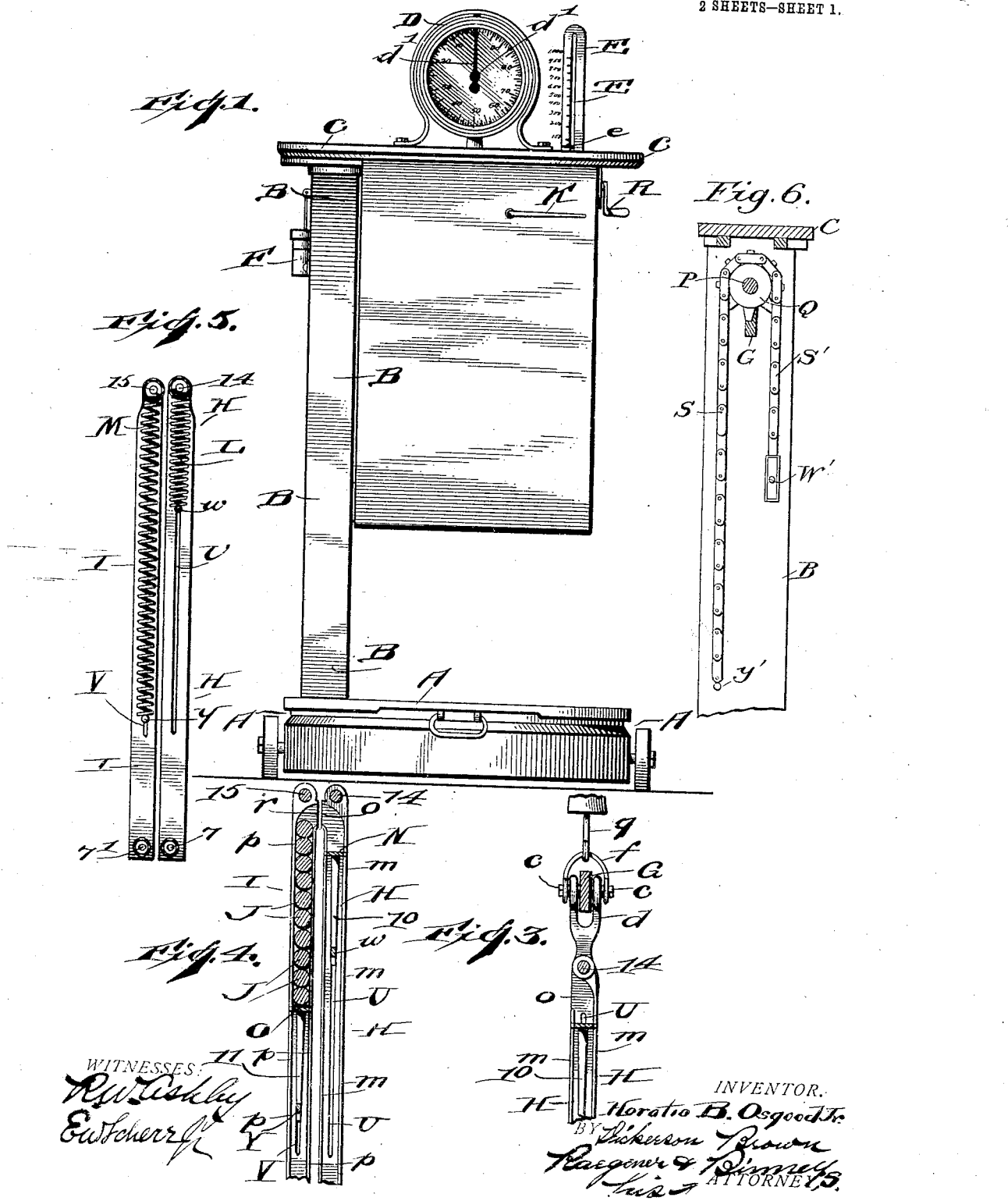
INVENTOR.
Horatio B. Osgood Jr.
BY Dickerson Brown
Raegener & Binney
ATTORNEYS
WITNESSES:
R. W. Ashley
E. W. Scherr

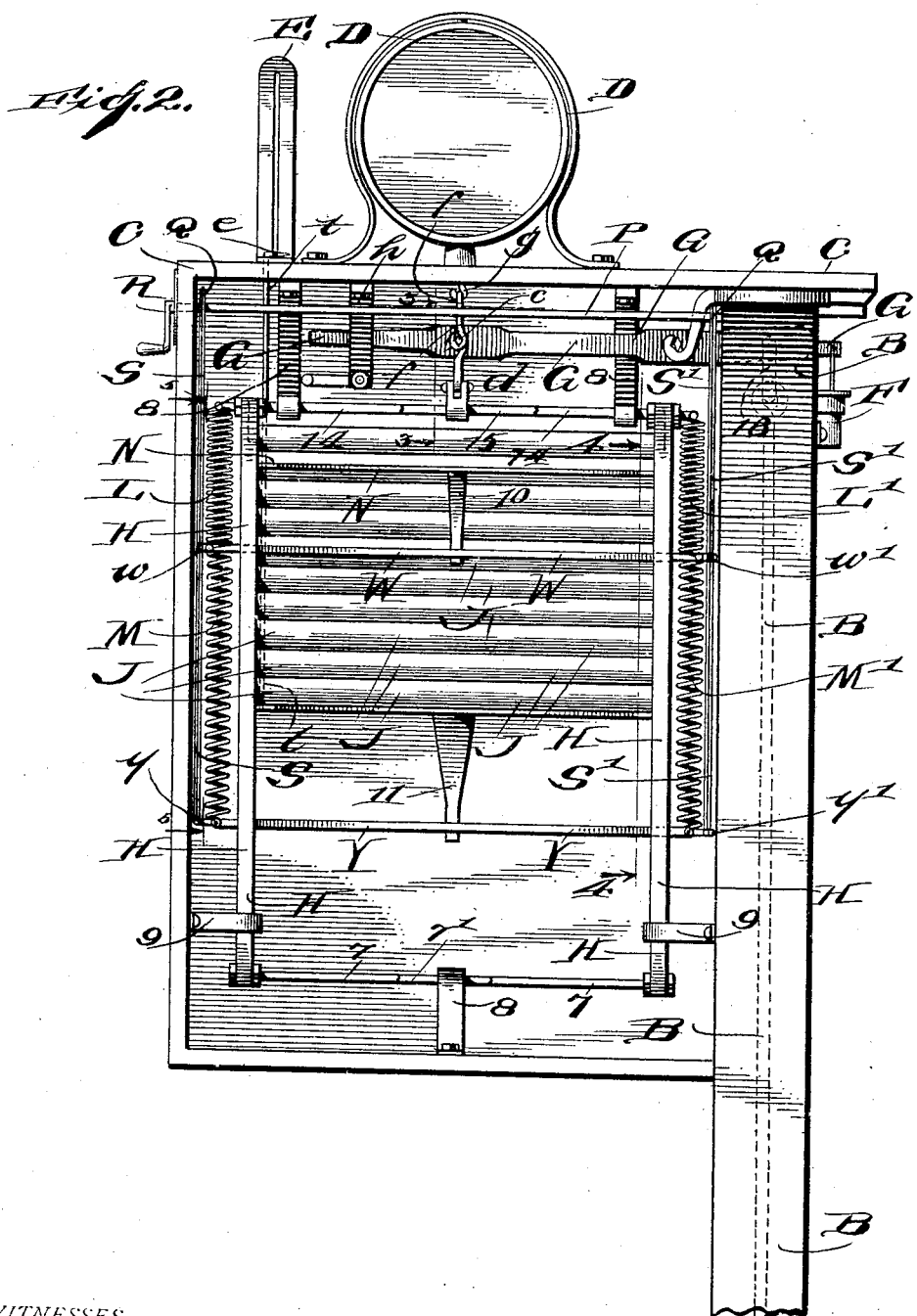

UNITED STATES PATENT OFFICE.

HORATIO B. OSGOOD, JR., OF BINGHAMTON, NEW YORK, ASSIGNOR TO FREDERICK W. GEISSENHAINER, JR., OF NEW YORK, N. Y.

SCALE.

No. 839,025.            Specification of Letters Patent.            Patented Dec. 18, 1906.

Application filed October 7, 1904. Renewed May 22, 1906. Serial No. 318,227.

*To all whom it may concern:*

Be it known that I, HORATIO B. OSGOOD, Jr., a citizen of the United States, residing at Binghamton, county of Broome, and State of New York, have invented certain new and useful Improvements in Scales, of which the following is a specification, accompanied by drawings.

This invention relates to scales, more particularly to scales of large capacity; and the objects of the invention are to simplify and shorten the operation of weighing by doing away entirely with the graduated beam and movable poise.

Further objects of the invention will hereinafter appear; and to these ends the invention consists of a scale for carrying out the above objects embodying the features of construction, combinations of elements, and arrangement of parts having the general mode of operation substantially as hereinafter fully described and claimed in this specification and shown in the accompanying drawings, in which—

Figure 1 is a front elevation of a platform-scale embodying my improvements as such a scale would appear in use. Fig. 2 is a rear view of the upper part of Fig. 1 with the back removed to show the interior mechanism. Fig. 3 is a cross-section of the beam and the upper part of the counterpoise weight-holder along the line 3 3 of Fig. 2 looking in the direction of the arrows. Fig. 4 is a cross-section of the weight-holder and of the counterpoise weight-holder along the line 4 4 of Fig. 2 looking in the direction of the arrows. Fig. 5 is an end view of the weight-holder and of the counterpoise weight-holder seen in the direction of the arrow on the left-hand side of Fig. 2. Fig. 6 is an enlarged detail sectional end view of the scale on line 10 10, showing the arrangement of the chains.

In the ordinary platform-scale the platform and the weighing-beam are connected by a system of levers; but in accordance with the present invention, since there is no graduated weighing-beam, the final lever of the system of levers will be termed the "beam" throughout the specification.

The accompanying drawings show one embodiment of my improvements, the same being applied to a portable platform-scale. Said scale may be, as shown, of any usual construction, A being the platform, B the vertical standard, and C the cap. The levers which support the platform A and the parts which connect said levers with the beam are not indicated in the drawings, since they may be of any usual construction and form no part of the present invention. D is a spring-balance provided with a dial upon which the pointer $d'$ registers any elongation or contraction of the spring, as when weight is applied thereto or released therefrom. This spring-dial is conveniently supported upon the cap, as shown, and the counterpoise end of the beam is suitably connected to the spring of the spring-balance in any suitable manner—as, for example, by means of the loop $f$, which in turn is suspended from the hook $g$, attached to the spring. The loop $f$ hooks under the knife-edge $c$ and is provided with suitable bearing-surfaces for the purpose of engaging said knife-edge. The loop is made double, so as to straddle the beam and engage the knife-edge $c$, which is rigidly secured in the beam and extends outward from both sides thereof. The counterpoise weight-holder in the construction shown is the member H, which is suspended from the counterpoise end of the beam in any suitable fashion—for example, by means of the loop $d$ straddling the under side of the beam and hooking over the aforesaid knife-edge $c$—suitable bearing-surfaces being provided, as before, on this loop $d$ for engaging said knife-edge.

The construction of the counterpoise weight-holder shown is one adapted to the mechanical transfer to and from it of weights; but it may be of any suitable construction, and the weights can be transferred by hand instead of mechanically. The construction of the counterpoise weight-holder shown will be detailed later on.

The weights J shown in the drawings are ten in number and are of uniform denominations—that is to say, each when placed on the counterpoise weight-holder would represent on the platform a load of one hundred pounds. The graduated beam for this size of scale on the ordinary scale would be graduated by one-half-pound divisions up to one hundred pounds. Consequently the dial on the present scale reads up to one hundred pounds by one-half-pound divisions.

It will be noted that the beam G in its normal position is at the top of the trig-loop h, so that when a load comes onto the platform of the scale the position of the beam G is not changed thereby, and that in order to weigh the load on the platform it is necessary to add weights to the counterpoise weight-holder until enough have been added to overbalance the load, the said excess weight in the counterpoise weight-holder acting to draw the beam down, and so extend the spring of the spring-balance, which thereupon takes up or relieves the counterpoise end of the beam of the weight by which it is in excess of the load. Thus, for example, assume that there were no weights in the counterpoise weight-holder and that a load of sixty pounds were placed on the platform. This would have no apparent effect on the scale or the dial; but when a weight was applied to the counterpoise weight-holder, the weight representing one hundred pounds and the load on the platform being only sixty pounds, the counterpoise end of the beam would drop and exert a pull on the spring of the spring-balance equal to the amount by which the weight in the counterpoise weight-holder exceeds the load. It must be remembered at this point that any one of the weights when placed on the counterpoise weight-holder of the scale with no load on the platform will cause the pointer on the dial to make one complete revolution. In this case, since the load on the platform is sixty pounds, or six-tenths of one hundred, and the weight on the counterpoise weight-holder is the equivalent of one hundred pounds on the platform, the pull on the spring will be the difference—viz., four-tenths of the weight on the counterpoise weight-holder. It will be readily seen that this will cause the pointer on the dial to revolve four-tenths of the whole circumference of the dial. With a dial marked in the ordinary way, from right to left, it will be seen that in this case the pointer would stop at "40 lbs." on the dial. What I require of the pointer in this case is to stop at "60" on the dial, and so show the amount on the platform. To obtain this result, I do either of two things—viz., mark the dial counterclockwise instead of clockwise, the pointer rotating clockwise, or so arrange the mechanism of the spring-balance that the pointer on the dial will travel counterclockwise instead of clockwise, the graduations in increasing in a clockwise direction. In either of these cases it will be readily seen that if the pointer travels four-tenths of the distance around the dial it stops at "60" instead of "40," so showing the actual load on the platform, and so all the way around. Next assume that there is a load on the platform of over one hundred pounds—for instance, a load of three hundred and forty pounds. This likewise will have no effect on the spring-balance until four one-hundred-pound weights have been applied to the counterpoise weight-holder, in which event the counterpoise end of the beam will drop and a pull of sixty pounds will be exerted on the spring-balance, and the pointer will move six-tenths of the distance around the dial, and so register "40 lbs." In this case the weight on the platform will be computed by adding the weight indicated by the spring-balance to the total weights inserted in the counterpoise weight-holder less one. In other words, the first weight inserted in the counterpoise weight-holder is never considered when computing weighings made with the scale shown.

Since the first one-hundred-pound weight applied to the counterpoise weight-holder in the scale shown and described is not considered in computing the weighing and since at least one such weight must always be applied to the counterpoise weight-holder before any weighing can be made, it follows that this first weight is, as it were, a blank weight and may be, if desired, carried constantly on the counterpoise weight-holder, so that the scale would always be in condition to weigh the full amount shown on the dial without performing any operation whatever.

A convenient way of indicating the number of weights in the counterpoise weight-holder to be added in computing the load is shown in one of its forms in the accompanying drawings and consists of a pointer e, connected by a rod t to the movable bottom of the weight-holder, the said pointer moving over a graduated scale E, and so adapted thereto that when only one weight has been transferred to the counterpoise weight-holder said pointer will register nothing, but that, beginning with the second and each succeeding weight so transferred, the said pointer shall register "100," "200," "300," &c., assuming, of course, that each weight represents one hunderd pounds and that the first weight has not been incorporated and made a part of the counterpoise, as heretofore suggested.

The means provided for mechanically transferring the weights to and from the counterpoise weight-holder are as follows: Since the form of weights shown in the drawings is cylindrical, the counterpoise weight-holder H is accordingly made of suitable construction to hold weights of this shape. I further provide a stationary weight-holder I, which likewise is suitably constructed to hold weights of cylindrical form, and finally I provide suitable means for transferring said weights from the stationary weight-holder into the counterpoise weight-holder, and vice versa, as the operation of weighing requires. The stationary weight-holder I is provided with the guides p p (see Fig. 4) and the counterpoise weight-holder H with the guides m m for the purpose of engaging said weights and retaining them in vertical alinement one above the other. The guides p p of the stationary weight-holder are connected to each other by rods 15 and 7', which are supported from the frame of the scale by brackets 8 and 9. The guides $m\ m$ of the counterpoise holder are connected by rods 14 and 7. The stationary weight-holder is provided with a movable bottom O, upon which the column of weights rests, the said bottom being in turn rigidly connected by the strut 11 to the member Y, which has projecting ends $y\ y'$, which pass through and engage guiding-slots V, Fig. 5, in the sides of the stationary weight-holder. The guides $p\ p$ of the stationary weight-holder are cut away sufficiently at their tops (see $r$, Fig. 4) and are likewise suitably curved (see Fig. 4) so as to permit the easy transfer of weights to and from the said holder. The springs M and M' connect the top of the stationary weight-holder with the parts $y\ y'$, secured to the movable bottom of the holder, and serve to support said bottom and any weights contained therein, whereby the top weight of the series is maintained at the top of the holder, so as to be in convenient position to be pressed out of the holder when said movable bottom is raised.

The counterpoise weight-holder shown is in all respects substantially similar to the weight-holder, with the exception that it is not fixed, but is freely suspended from the beam of the scale in the manner of ordinary counterpoises. Thus it too has guides $m\ m$, which serve to hold the weights in vertical alinement one with the other, also a movable bottom N, likewise spring-supported by means of the springs L and L', which are placed at the sides of the counterpoise weight-holder and connect the top thereof with the projecting ends $w\ w'$ of the guide-rod W, which is rigidly connected by the strut 10 to the movable bottom and which projecting ends $w\ w'$ of the guide-rod pass through and slide in vertical slots U in the sides of the counterpoise weight-holder. Moreover, an opening $o$ is provided at the top of the counterpoise weight-holder, so that weights can be transferred through this opening from the weight-holder into the counterpoise weight-holder and back again, the said weight-holder and the counterpoise weight-holder being so adapted to each other that when the beam of the scale is up and calls for the transfer of weights from the weight-holder into the counterpoise weight-holder said counterpoise weight-holder hangs alongside the weight-holder with its opening $o$ in juxtaposition with the opening $r$ in the weight-holder. The means for transferring the weights between the weight-holder and counterpoise weight-holder consists of the chains S and S', the ends of which respectively are connected to the ends of the guide-rods W and Y', attached to the movable bottoms, respectively, of the counterpoise weight-holder and the weight-holder. These chains travel on the sprockets Q Q', which in turn are supported by and rotate on the shaft P, suitably journaled and rotated by means of the crank R. It is apparent that upon operating this crank R in one direction or the other the chains will be caused to travel and acting upon the movable bottoms of the weight-holder and the counterpoise weight-holder will cause any weights supported thereon to be transferred from said weight-holder into the counterpoise weight-holder, or vice versa. In the normal position of the chains and counterpoise weight-holder the chains do not come in contact with said holder.

As shown, the last links 100 of the chains which coöperate with the ends $w\ w'$ of guide-rod W, connected to the movable bottom N of the counterpoise weight-holder, are elongated and provided with openings of sufficient length to permit the rod ends $w\ w'$ a certain amount of play in said links. The links 100, as shown, are slipped loosely over the rod ends $w\ w'$, and therefore when the chains are loose and a weighing operation is to be carried out said chains do not interfere in any way with the operation of weighing. The slots in links 100 are sufficiently long to permit the counterpoise weight-holder the desired amount of play when weighing. By tightening the chains the weights may be transferred back to the stationary holder.

The mode of operation of the means for mechanically transferring the weights is as follows: Assuming that we are conducting an actual weighing and that the load has been placed on the platform of the scale, the beam G will be at the top of the trig-loop $h$, the spring-balance will be indicating nothing, and the opening $o$ in the counterpoise weight-holder will be opposite the opening $r$ in the weight-holder. Since the spring-balance is registering nothing, it is seen by the operator that weights are called for by the counterpoise weight-holder in order to make it overbalance the load being weighed. The operator accordingly turns the handle R so as to transfer weights one by one from the weight-holder into the counterpoise weight-holder. He will know when he has transferred sufficient weights, because as soon as he has done so the spring-balance will register, and, further, the counterpoise weight-holder will drop, so that its opening no longer registers with the opening in the weight-holder, and the further passage of weights is thereby prevented. The pointer on the graduated scale then indicates the correct number of weights to be counted, and this, with the amount indicated on the dial, correctly shows the weight of the load.

A dash-pot F is preferably connected to the beam, so as to check the vibration of the pointer.

Obviously some features of my invention may be used without others, and my invention may be embodied in widely-varying forms. Therefore, without limiting the invention to the constructions shown and described, nor enumerating equivalents, I claim and desire to secure by Letters Patent the following:

1. In a weighing apparatus, the combination with the beam and counterpoise weight-holder, of means for counterbalancing by spring tension the excess in units of weight on the counterpoise weight-holder in such manner as to indicate the fractional parts of the load on the platform, means for mechanically applying units of weight to the counterpoise weight-holder, and means for automatically indicating the number of weights less one in the counterpoise holder.

2. In a weighing apparatus, the combination with the beam, weight-holder and counterpoise weight-holder, of means for counterbalancing by spring tension the excess in units of weights on the counterpoise weight-holder in such manner as to indicate the fractional parts of the load on the platform, means for mechanically applying units of weight to the counterpoise weight-holder, and for returning the weights to the weight-holder, and means for automatically indicating the number of weights less one in the counterpoise holder.

3. In a weighing apparatus, the combination with the beam, weight-holder and counterpoise weight-holder, of means for counterbalancing by spring tension the excess in units of weight on the counterpoise weight-holder in such manner as to indicate the fractional parts of the load on the platform, means for mechanically applying units of weight to the counterpoise weight-holder and for returning the weights from the counterpoise weight-holder to the weight-holder.

4. In a weighing apparatus, the combination with a beam, of a counterpoise weight-holder, a means operatively connected to said beam adapted at all times to relieve the counterpoise end of the beam of the excess of units in weight, by which the weight of the counterpoise weight-holder and weights overbalances the load being weighed, and indicating means for directly indicating the difference between such excess and the total of the weights on the counterpoise weight-holder.

5. In weighing apparatus, the combination of a beam and counterpoise weight-holder for weighing the load against weights of known denomination, said weights being designed to be applied in excess to overbalance said load, and of means for always automatically relieving the counterpoise end of the beam of the excess in units of weight, by which said weights overbalance the load and for indicating the difference between said excess and the total weight on the counterpoise weight-holder.

6. In weighing apparatus, the combination of a beam and counterpoise weight-holder, means for weighing the load against weights of known denomination, said weights being designed to be applied in excess to overbalance said load, and of means comprising a spring-balance for always relieving the counterpoise end of the beam of the excess, by which said weights overbalance the load and for indicating the difference between said excess and the total weight on the counterpoise weight-holder.

7. In weighing apparatus, the combination with a beam, of a counterpoise weight-holder, unit-weights of uniform denomination adapted to be applied to said counterpoise weight-holder, a spring-balance operatively connected to the beam and adapted at all times to relieve the counterpoise end of the beam of weight applied to the counterpoise weight-holder in excess of the load, said spring-balance having a maximum weighing capacity equal to the denomination of one of said unit-weights, said spring-balance being constructed to automatically indicate the difference between the total amount of said unit-weights and the amount of excess weight sustained by the spring-balance.

8. In weighing apparatus, the combination with a beam, of a counterpoise weight-holder, unit-weights of uniform denomination adapted to be applied to said counterpoise weight-holder, a spring-balance operatively connected to the beam and adapted to sustain weight applied to the counterpoise weight-holder in excess of the load, said spring-balance having a maximum weighing capacity equal to the denomination of one of said unit-weights, said spring-balance being constructed to automatically indicate the difference between the total amount of said unit-weights and the amount of excess weight sustained by the spring-balance, and further indicating means constructed to automatically indicate the number of unit-weights on the counterpoise weight-holder to be added to the indication of the spring-balance to equal the load.

9. In a weighing apparatus, the combination with a beam and weights of uniform denomination, of a fixed weight-holder, a counterpoise weight-holder and mechanism for transferring said weights from the weight-holder to the counterpoise weight-holder and back again from the counterpoise weight-holder to the weight-holder, said counterpoise weight-holder being operatively constructed and arranged to automatically prevent the passage of further weights from the weight-holder into the counterpoise weight-holder as soon as the weight on the counterpoise weight-holder overbalances the load.

10. In weighing apparatus, the combination with a beam, of a counterpoise weight-holder adapted to hold weights uniformly disposed one above the other and having a movable spring-supported bottom upon which said weights rest, a fixed weight-holder adapted to hold weights uniformly disposed one above the other and provided with a movable spring-supported bottom upon which said weights rest, the fixed weight-holder having an opening, and the counterpoise weight-holder having an opening, which openings register with each other in a certain position of the counterpoise weight-holder so that weights can be transferred between the weight-holder and the counterpoise weight-holder through said openings, and mechanism for transferring said weights between said weight-holder and said counterpoise weight-holder.

11. In weighing apparatus, the combination with a beam, of a counterpoise weight-holder adapted to hold weights uniformly disposed one above the other and having a movable spring-supported bottom upon which said weights rest, a fixed weight-holder adapted to hold weights uniformly disposed one above the other and provided with a movable spring-supported bottom upon which said weights rest, the fixed weight-holder having an opening and the counterpoise weight-holder having an opening, which openings register with each other in a certain position of the counterpoise weight-holder so that the weights can be transferred between the weight-holder and the counterpoise weight-holder through said openings, and chain and sprocket-wheel mechanism adapted to actuate the movable bottoms of the weight-holder and counterpoise weight-holder and to transfer the weights to and fro between them.

12. In weighing apparatus, the combination with a beam, of a counterpoise weight-holder adapted to hold weights uniformly disposed one above the other and having a movable spring-supported bottom upon which said weights rest, a fixed weight-holder adapted to hold weights uniformly disposed one above the other and provided with a movable spring-supported bottom upon which said weights rest, the fixed weight-holder having an opening and the counterpoise weight-holder having an opening, which openings register with each other in a certain position of the counterpoise weight-holder so that weights can be transferred between the weight-holder and the counterpoise weight-holder through said openings, mechanism for transferring said weights between said weight-holder and said counterpoise weight-holder, and a spring-balance operatively connected to the beam and adapted to counterbalance the excess weight, by which the weights in the counterpoise weight-holder overbalance the load being weighed.

13. In a weighing-scale, the combination of a beam and counterpoise weight-holder, the counterpoise end of the beam being normally in a raised position whereby the position of the beam will remain unchanged when a load comes on the scale until sufficient weight is added to the counterpoise weight-holder to overbalance the load, and a spring-balance connected to relieve the counterbalance end of the beam of the weight in excess of the load, said spring-balance being constructed to indicate directly the fractional parts of the load on the scale.

14. In a weighing-scale, the combination of a beam and counterpoise weight-holder, a device constructed to register the total number of units of weight on the counterpoise weight-holder less one, and a spring-balance responsive to the excess weight on the counterpoise weight-holder and also constructed to indicate directly the fractional parts of the load on the scale.

15. In a weighing-scale, the combination of a beam and counterpoise weight-holder, a stationary weight-holder, mechanical means for transferring units of weight to and from the counterpoise weight-holder, a device for registering the total number of unit-weights less one in the counterpoise weight-holder, a spring-balance connected to the beam for relieving the counterpoise end of the beam of the weight in excess of the load, said balance being constructed to indicate directly the fractional parts of the load on the scale.

16. In a weighing-scale, the combination of a beam and counterpoise weight-holder, a device constructed to register the total number of weights less one on the counterpoise weight-holder, a spring-balance responsive to the excess weight in the counterpoise weight-holder and constructed to indicate directly the differences between such excess and the total sum of the weights on the counterpoise holder.

17. In a weighing apparatus the combination with the beam, weight-holder and counterpoise weight-holder, of means for counterbalancing the excess in units of weight on the counterpoise weight-holder in such manner as to indicate the fractional parts of the load on the platform, means for mechanically applying units of weight to the counterpoise weight-holder and for returning the weights to the weight-holder, and means for automatically indicating the number of weights in the counterpoise weight-holder.

18. In a weighing-scale the combination of a beam, weight-holder and counterpoise weight-holder, means for mechanically transferring the weights to and from the weight-holder and counterpoise weight-holder, a device constructed to register the total number of units of weight on the counterpoise weight-holder and a spring-balance responsive to the excess weight on the counterpoise weight-holder and also constructed to indicate directly the fractional parts of the load on the scale.

19. In a weighing-scale the combination of a beam, weight-holder and counterpoise weight-holder, a device constructed to register the total number of units of weight on the counterpoise weight-holder and a spring-balance responsive to the weight on the counterpoise weight-holder and also constructed to indicate directly the fractional parts of the load on the scale.

In testimony whereof I have signed this specification in the presence of two subscribing witnesses.

HORATIO B. OSGOOD, Jr.

Witnesses:
E. Van Zandt,
A. L. O'Brien.